United States Patent [19]

Siegal

[11] Patent Number: 4,882,543
[45] Date of Patent: Nov. 21, 1989

[54] VACUUM TESTING APPARATUS HAVING A TEST ENCLOSURE WITH A ROTATABLE SLEEVE

[75] Inventor: Burton L. Siegal, Skokie, Ill.

[73] Assignee: Electro-Technic Products, Inc., Chicago, Ill.

[21] Appl. No.: 226,872

[22] Filed: Aug. 1, 1988

[51] Int. Cl.⁴ .................... G01L 23/16; G01L 21/30
[52] U.S. Cl. ............................ 324/460; 324/158 F
[58] Field of Search .............. 324/460, 158 F; 73/52, 73/4 V, 4 R; 361/344

[56] References Cited

U.S. PATENT DOCUMENTS 4,546,319 10/1985 Pfaff et al. ............................ 324/460
4,757,255 7/1988 Margozzi ........................ 324/158 F Primary Examiner—Reinhard J. Eisenzopf
Assistant Examiner—Anthony L. Miele
Attorney, Agent, or Firm—Lee & Smith

[57] ABSTRACT

A manual apparatus for testing the vacuum of an evacuated vial. A cylindrical test enclosure having an access opening in the wall thereof is provided for the vial. A rotatable sleeve surrounds the enclosure and has a like access opening in registration with and rotatable to be in alignment with the access opening of the test enclosure. When the two access openings are rotated out of alignment, high voltage radio frequency power is applied to the exterior of the vial, and an intense flash of light occurs next to the vial to cause ionization of gas within the vial. The ionization current which results is indicative of the value of the vacuum within the vial.

16 Claims, 3 Drawing Sheets

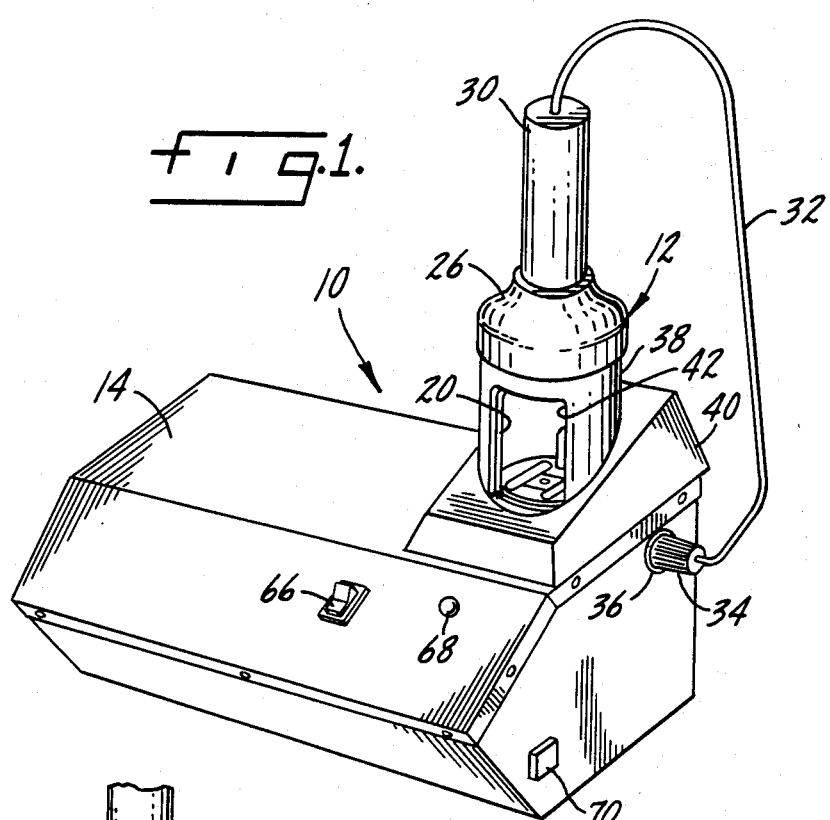
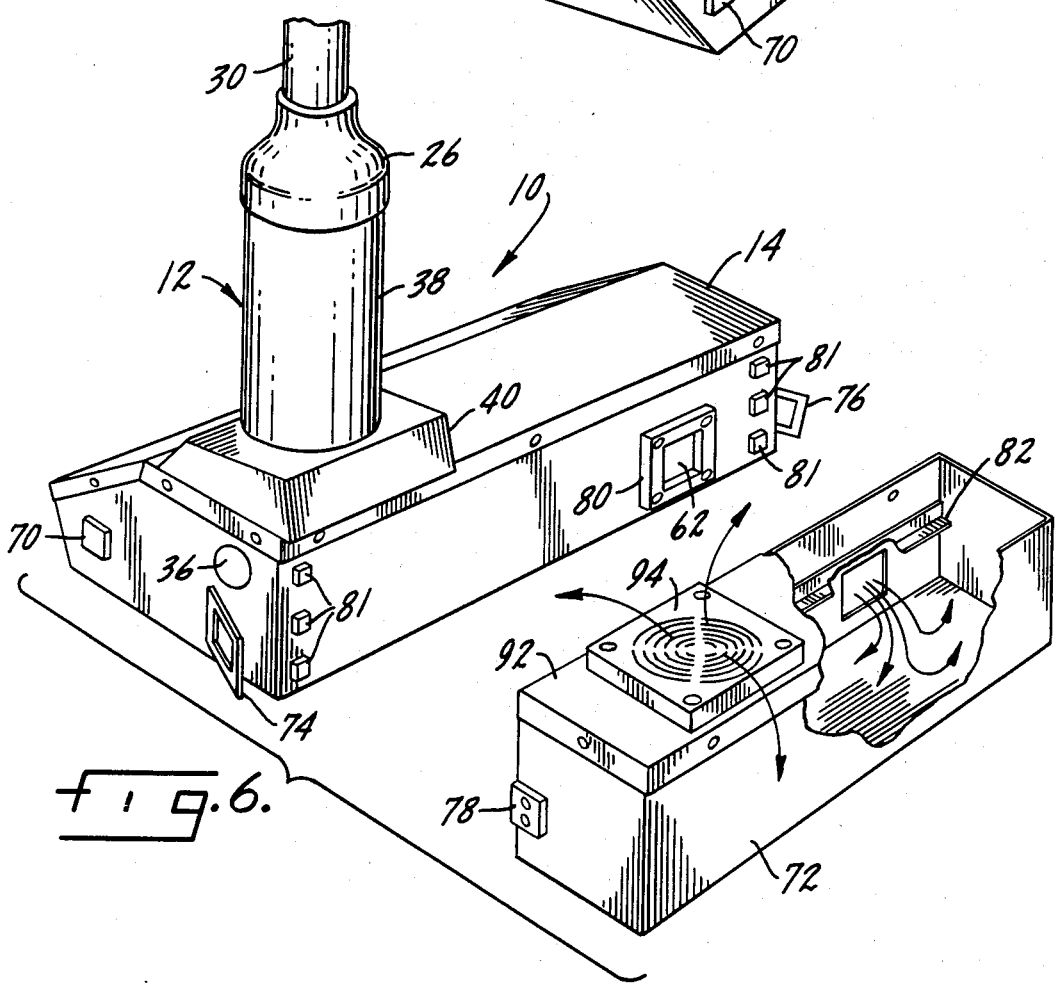

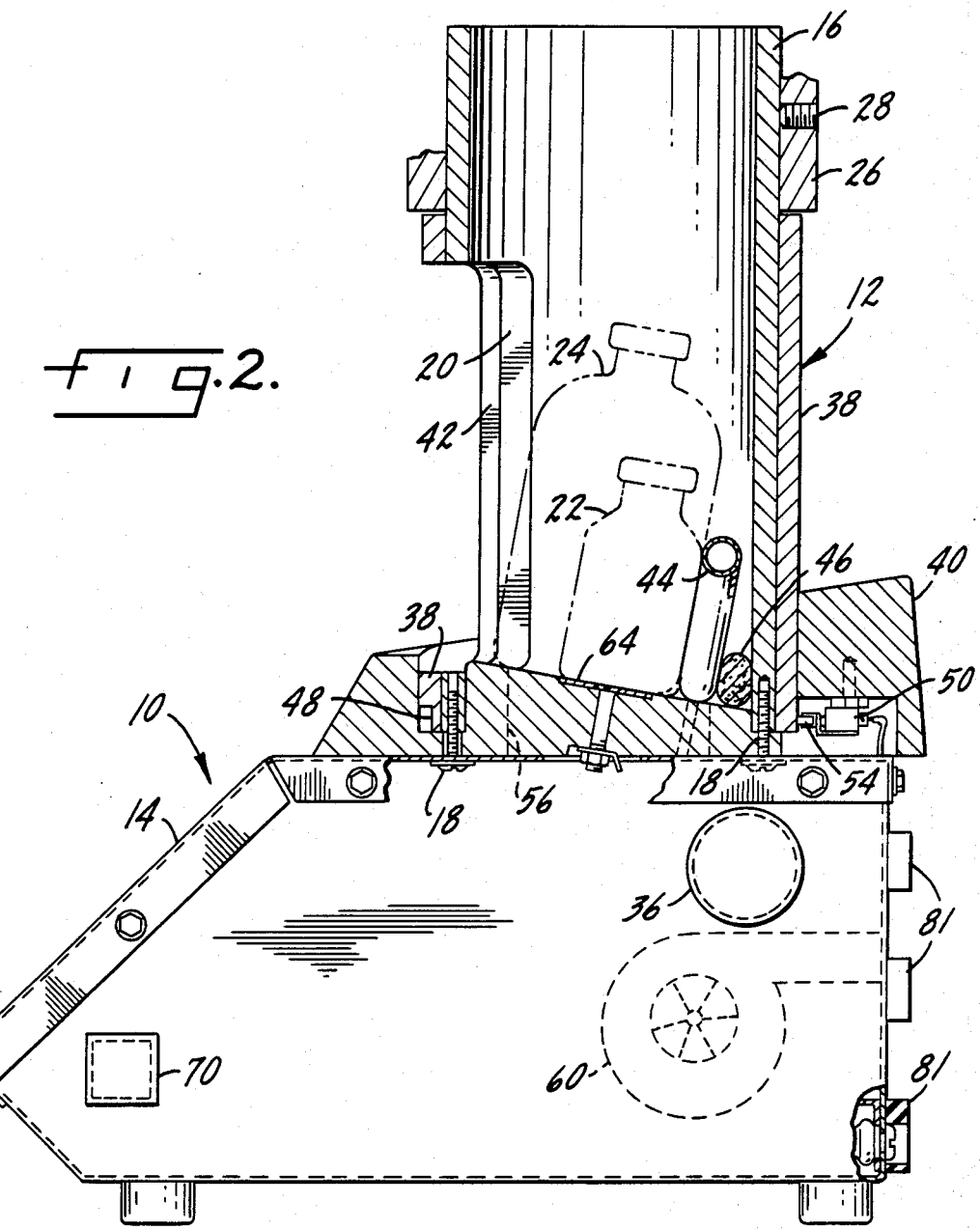

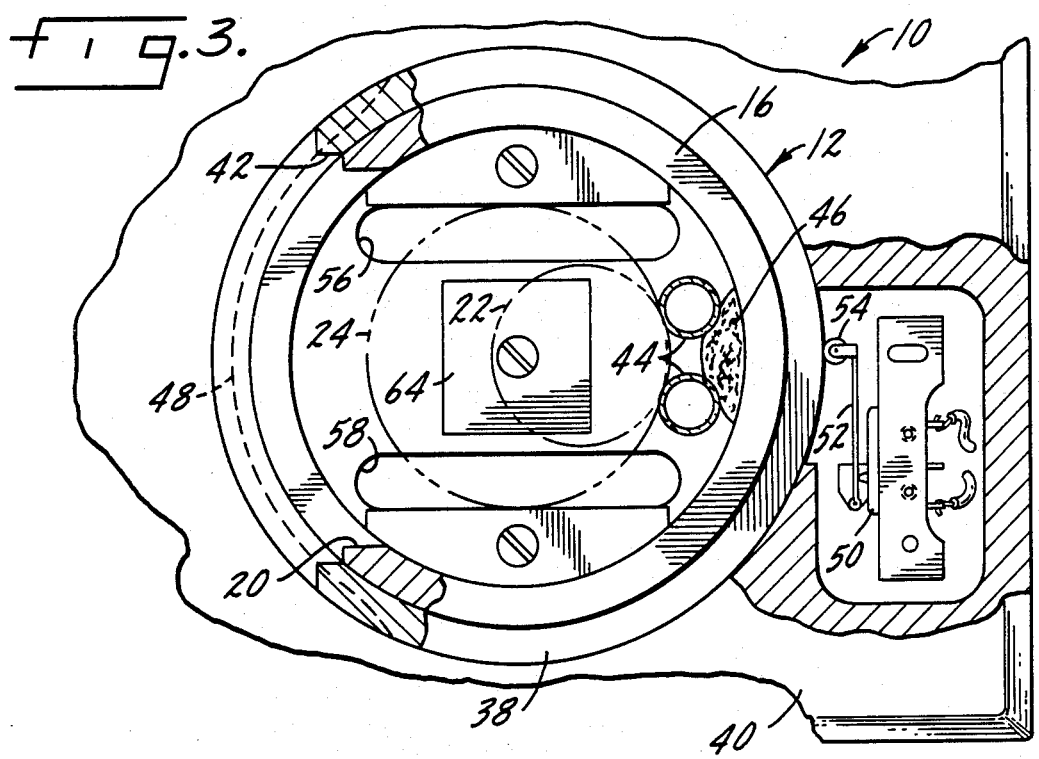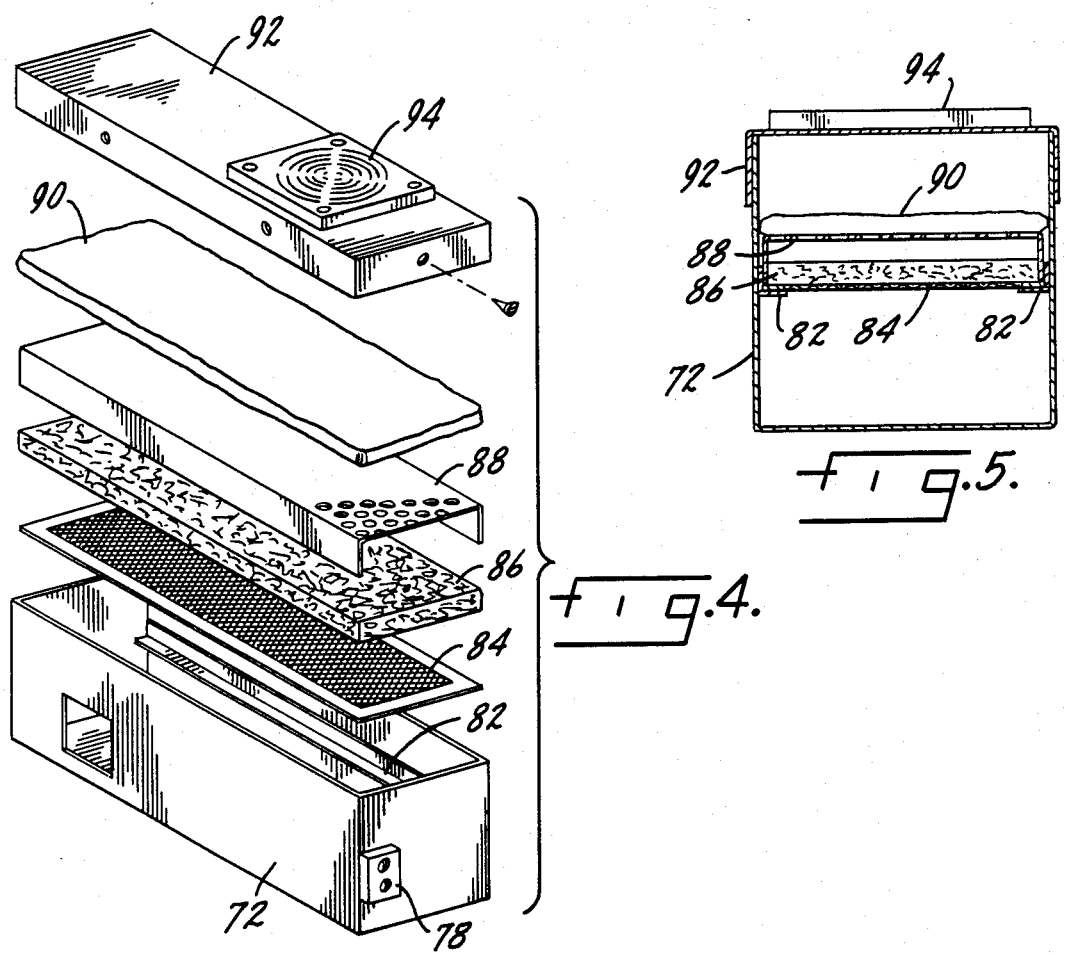

VACUUM TESTING APPARATUS HAVING A TEST ENCLOSURE WITH A ROTATABLE SLEEVE

BACKGROUND OF THE INVENTION

This invention relates to the testing of the degree of vacuum in an evacuated vial, and in particular to an apparatus for testing the degree of vacuum by ionizing the gas within the vial and measuring the ionization current, which is directly representative of the value of the vacuum within the vial.

Evacuated vials can be tested without opening the vial or inserting any test probe or other device into the vial, which may compromise the integrity of the contents within the vial, or destroy the vacuum. U.S. Pat. No. 4,546,319 discloses an automated method and apparatus for testing the vacuum of a series of vials which may be proceeding down a conveyer system. While the apparatus of this patent successfully test vials, because of its size and complexity, the apparatus of the invention proves to be relatively expensive. For small operations not requiring an assembly line-type vacuum investigation, the apparatus of this invention is prohibitively expensive.

SUMMARY OF THE INVENTION

The invention pertains to a relatively simple apparatus for testing the vacuum of an evacuated vial. A test enclosure is provided for a single vial, the enclosure having an access opening for introduction of the vial. A cover is provided, the cover being positionable in a first orientation to cover the access opening and in a second orientation to expose the access opening. A source of high voltage radio frequency power is provided in the test enclosure for applying such power externally to the vial. Also within the enclosure is an illumination means for applying a momentary intense flash of light to the vial of sufficient magnitude to cause ionization of gas within the vial. The illumination means is energized only when the cover is positioned in the first orientation after repositioning of the cover from the second orientation to the first. The ionization current of the gas within the vial is sensed and a signal is generated if the sensed ionization current exceeds a predetermined minimum value which is indicative of a predetermined minimum value of vacuum within the vial.

In accordance with the preferred embodiment of the invention, the test enclosure is cylindrical and the cover comprises a rotatable sleeve having an access opening in registration with and rotatable to be in alignment with the access opening of the test enclosure. The means for energization of the illumination means comprises a cam formed in the rotatable sleeve and a stationary microswitch mounted adjacent the cam, the microswitch having a switch arm comprising a follower engaging the cam as the sleeve is rotated.

In order to assure that the vials are properly orientated within the enclosure adjacent the illumination means, an inclined vial support base is provided within the enclosure, with the base being sloped downwardly toward the illumination means. An impact cushion is situated between the illumination means and the wall of the enclosure to absorb the impact of a vial striking the illumination means by permitting the illumination means to move slightly when struck.

When the apparatus according to the invention is utilized, ozone is generated within the enclosure. In order to eliminate generated ozone where necessary, the invention includes an aperture in the bottom of the enclosure and an exhaust fan which draws air and ozone from the enclosure through the aperture in the bottom. A catalytic filter is mounted so that all exhausted air and ozone passes through the filter before being expelled to the atmosphere.

BRIEF DESCRIPTION OF THE DRAWINGS

The invention is described in greater detail in the following description of examples embodying the best mode of the invention, taken in conjunction with the drawing figures, in which:

FIG. 1 is a front perspective view of the apparatus according to the invention, with the ozone removing means not shown, FIG. 2 is an enlarged side elevational view of the apparatus according to the invention, partly in cross section and with certain portions removed or broken away for purposes of illustration, again with the ozone elimination means omitted, FIG. 3 is a further enlarged fragmentary top plan view of the apparatus immediately adjacent the test enclosure, with the top of the enclosure removed and with portions in cross section to illustrate detail, FIG. 4 is an exploded perspective view of a catalytic converter for eliminating ozone generated by the apparatus of the invention, FIG. 5 is a cross-sectional view taken across the catalytic converter, illustrating the various components thereof, as assembled, and FIG. 6 is a perspective view illustrating the means by which the catalytic converter is attached to the rear of the vial testing apparatus.

DESCRIPTION OF EXAMPLES EMBODYING THE BEST MODE OF THE INVENTION

The vacuum testing apparatus according to the invention is shown generally at 10 in the drawing figures. It is composed of a test portion 12 mounted on a hollow cabinet 14 which contains all electronics and apparatus for proper operation of the testing apparatus 10.

As best shown in FIGS. 1 through 3, the test portion 12 comprises a cylindrical enclosure 16 secured by means of a plurality of screws 18 to the cabinet 14. The enclosure 16 has an access opening 20 to allow insertion of vials which are to be tested. Such vials have been illustrated in phantom at 22 and 24 in FIGS. 2 and 3. Obviously, only one vial 22 or 24 is accommodated at a time.

The enclosure 16 is capped by a funnel-shaped member 26 which is secured to the enclosure 16 by means of one or more set screws 28. Secured within the member 26 is a voltage source 30 which is in communication with the interior of the enclosure 16 and which delivers high voltage radio frequency power to the enclosure 16. By radio frequency, it is meant typical frequencies in the radio frequency range, 10 KHz through $10^6$ MHz. The applicant has found suitable for use the model BD-20 high frequency radio frequency source manufactured by Electro-Technic Products, Chicago, IL. When the BD-20 is operated at 50 KV and 4 to 5 MHz, the voltage and frequency are sufficient for the purposes of the invention.

The voltage source 30 is connected via a cord 32 to a plug 34 secured within an outlet 36 on the side of the cabinet 14. From the outlet 36, the cord 32 leads to an electronic circuit for operating the apparatus 10, and the circuit may be identical to that illustrated in U.S. Pat. No. 4,546,319, the disclosure of which is incorporated herein by reference.

A rotatable cover sleeve 38 is positioned about the enclosure 16, captured between the member 26 and a channel formed within a base 40 secured to the top of the cabinet 14. Similar to the enclosure 16, the sleeve 38 includes an access opening 42 which is in registration with the access opening 20 and which may be rotated with the sleeve 38 to be in alignment with the access opening 20. When the access openings 42 and 20 are aligned, a vial 22 or 24 may be inserted within the enclosure 16.

For causing ionization of gas within a vial within the enclosure 16, the test portion 12 includes a flash tube 44, which is not rigidly mounted within the enclosure 16, but rather held in place by a soft cushion 46. The cushion 46 permits the flash tube 44 to move slightly upon impact by a vial 22 or 24, absorbing the impact and reducing the likelihood that the flash tube 44 may be damaged.

The base 40 is inclined within the enclosure 16, the base being sloped downwardly toward the flash tube 44 so that any vial inserted within the enclosure 16, no matter what size, will tend to be properly positioned immediately against the flash tube 44 to ensure that when the flash tube 44 is activated, ionization within the vial will commence. The angle of inclination of FIG. 2 is 10 degrees, although the angle of inclination can be varied somewhat as desired.

The sleeve 38, when rotated so that the access openings 42 and 20 are out of alignment, causes activation of the flash tube 44 and the voltage source 30. To this end, the sleeve 38 includes a cam track 48 at the bottom thereof. A microswitch 50, having an activation arm 52 and integral cam follower 54, traverses the exterior of the sleeve 38, and is in alignment with the cam track 48, so that when the sleeve 38 is rotated sufficiently, the cam follower 54 enters the cam track 48 to activate the microswitch 50. As illustrated, rotation of the sleeve 38 approximately 135 degrees in either direction, sufficient to cause full misalignment of the access openings 42 and 20, rotates the cam track 48 efficiently so that the cam follower 54 begins entry of the cam track 48.

When the test portion 12 is closed, and the voltage source 30 is activated, ozone is generated within the enclosure 16. In order to withdraw the generated ozone, the base 40 includes a pair of apertures 56 and 58 which lead to the hollow interior of the cabinet 14. Mounted within the cabinet 14 is an exhaust blower 60 which exhausts through an opening 62 (FIG. 6) in the rear of the cabinet 14. Ozone generated within the enclosure 16 is therefore drawn by the exhaust blower 60 through the apertures 56 and 58 and is exhausted through the opening 62.

For proper activation of the voltage source 30, an electrode 64 is located within the enclosure 16 in the inclined portion of the base 40. The electrode 64 is connected to the internal circuitry (not illustrated) within the cabinet 14 for activation of the flash tube 44 and voltage source 30. The cabinet 14 also carries a main power switch 66 connected to the same circuitry, a test light 68, and a fuse access 70.

On certain occassions, expulsion of ozone through the opening 62 directly to the atmosphere is not desired. In those instances, a catalytic converter 72 may be secured to the rear of the cabinet 14 by means of a pair of toggle clamps 74 and 76 mounted on the cabinet 14 which engage toggle latches 78 on opposite sides of the catalytic converter 72. A gasket 80 is mounted about the opening 62, and to prevent excessive compression of the gasket 80 by the toggle clamps 74 and 76, a series of pads 81 are mounted adjacent each of the clamps 74 and 76.

The catalytic converter 72 may be of a conventional design and includes opposite supports 82 upon which is seated a perforated shelf 84. An open cell foam filter or the like 86 is seated on the shelf 84. A perforated cover 88 is above the filter 86, and a porous bag of catalytic material 90 sits on the cover 88. A top 92 is secured to the catalytic converter 72 and a final filter 94 is secured to the top 92.

The testing apparatus 10 is activated simply and quickly. With the two access openings 20 and 42 aligned, a vial 22 or 24 is inserted within the enclosure 16, against the flash tube 44. The outer sleeve 38 is then rotated about the enclosure 16, and when the sleeve 38 has been rotated approximately 135 degrees, the cam follower 54 enters the cam track 48, activating the microswitch 50, which in turn activates the circuitry within the cabinet 14 to energize the flash tube 44 and the voltage source 30. The ionization current within the tested vial is then determined, and if the ionization current exceeds a predetermined minimum value, which is indicative of a predetermined minimum vacuum within the vial, the light 68 is lit. It not, the operator known that the vacuum within the tested vial is unacceptable, and by rotation of the sleeve 38 to again align the two openings 20 and 42, the vial can be removed and discarded if unacceptable, or kept if meeting minimum standards. The circuitry for the testing apparatus 10 is configured so that activation of the microswitch 50 only will energize the flash tube 44 and voltage source 30, and then only when the two openings 20 and 42 are rotated approximately 135 degrees to be fully out of alignment with one another.

If the catalytic converter 72 is utilized, it is mounted at the rear of the cabinet 14. The blower 60 draws air and any generated ozone from the interior of the enclosure 16 down through the apertures 56 and 58 and expels the air and ozone through the opening 62 into the lower plenum portion of the catalytic converter 72 beneath the stacked elements 84 through 90. The air and ozone passes through the filter 86 and catalyst bag 90, where the ozone is neutralized, and then finally passes through the final filter 94, which traps any particles which may be emitted by the catalyst 90.

The invention provides a simple means of manually testing vials at a relatively rapid rate of up to 800 or so per hour, depending of the dexterity of the operator. While a single form of the testing apparatus 10 and the optional catalytic converter 72 have been illustrated in the drawing figures and described above, it should be evident that various changes can be made to the invention without departing from the spirit thereof or scope of the following claims.

What is claimed is:

1. An apparatus for testing the vacuum of an evacuated vial, comprising
   a. a test enclosure of said vial, said enclosure having an access opening,
   b. cover means connected to said enclosure and positionable in a first orientation to cover said access opening and in a second orientation to expose said access opening through said cover means, c. means at said test enclosure for externally applying high voltage radio frequency power to said vial,
d. illumination means in said test enclosure for applying a momentary intense flash of light to the vial of sufficient magnitude to cause ignition of gas within the vial,
e. means to energize said illumination means only when said cover means is positioned in said first orientation after reposition of said cove means from said second orientation to said first orientation, and
f. means for sensing the ionization current of ionized gas within said vial and generating a signal if the sensed ionization current exceeds a predetermined minimum value indicative of a predetermined minimum value of the vacuum of the vial.

2. An apparatus according to claim 1 in which said test enclosure includes a cylindrical wall and said access opening is formed in said wall.

3. An apparatus according to claim 1 in which said test enclosure is cylindrical and said cover means comprises a rotatable sleeve having an access opening in registration with and rotatable to be in alignment with the access opening of said enclosure, said access openings being aligned when said cover means is in said second orientation.

4. An apparatus according to claim 3 in which said means to energize includes a cam formed in said sleeve and a stationary microswitch mounted adjacent said cam, said microswitch having a follower engaging said cam.

5. An apparatus according to claim 1 including an inclined vial support base within said enclosure, said base being sloped downwardly toward said illumination means.

6. An apparatus according to claim 5 including an impact cushion situated between said illumination means and said enclosure.

7. An apparatus according to claim 1 including means for eliminating generated ozone from said enclosure.

8. An apparatus according to claim 7 in which said means for eliminating ozone comprises an aperture in the bottom of said enclosure and means to exhaust said enclosure through said aperture.

9. An apparatus according to claim 8 including a catalytic filter mounted such that all exhaust from said enclosure is passed through said filter.

10. An apparatus for testing the vacuum of an evacuated vial, comprising
a. a cylindrical test enclosure for said vial, said enclosure having an access opening in the wall thereof,
b. a rotatable sleeve surrounding said enclosure, said sleeve having an access opening in registration with and rotatable with rotation of said sleeve to be in alignment with the access opening of said enclosure,
c. means at said test enclosure for externally applying high voltage radio frequency power to said vial,
d. illumination means in said test enclosure for applying a momentary intense flash of light to the vial of sufficient magnitude to cause ionization of gas within the vial,
e. means to energize said illumination means only when said access openings are not aligned, and
f. means for sensing the ionization current of ionized gas within said vial and generating a signal if the sensed ionization current exceeds a predetermined minimum value indicative of a predetermined minimum value of the vacuum of the vial.

11. An apparatus according to claim 10 in which said means to energize includes a cam formed in said sleeve and a stationary microswitch mounted adjacent said cam, said microswitch having a follower engaging said cam.

12. An apparatus according to claim 10 including an inclined vial support base within said enclosure, said base being sloped downwardly toward said illumination means.

13. An apparatus according to claim 12 including an impact cushion situated between said illumination means and said enclosure.

14. An apparatus according to claim 10 including means for eliminating generated ozone from said enclosure.

15. An apparatus according to claim 14 in which said means for eliminating ozone comprises an aperture in the bottom of said enclosure and means to exhaust said enclosure through said aperture.

16. An apparatus according to claim 15 including a catalytic filter mounted such that all exhaust from said enclosure is passed through said filter.

* * * * *